United States Patent
Cramer et al.

(10) Patent No.: US 7,055,633 B2
(45) Date of Patent: Jun. 6, 2006

(54) CONCRETE DRILL

(75) Inventors: Till Cramer, Feldkirch (AT); Reinhard Bertsch, Nenzing (AT); Peter Mugg, Feldkirch-Tosters (AT); Hanspeter Schad, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 207 days.

(21) Appl. No.: 10/620,486

(22) Filed: Jul. 16, 2003

(65) Prior Publication Data

US 2004/0079556 A1    Apr. 29, 2004

(30) Foreign Application Priority Data

Jul. 17, 2002    (DE) .................. 102 32 214

(51) Int. Cl.
*E21B 6/00*    (2006.01)

(52) U.S. Cl. ...................... 175/415; 175/417

(58) Field of Classification Search ................ 175/389, 175/414–419
See application file for complete search history.

(56) References Cited

U.S. PATENT DOCUMENTS

| 1,863,928 | A |   | 6/1932  | Macdonell |
|-----------|---|---|---------|-----------|
| 2,859,941 | A | * | 11/1958 | Carroll et al. .............. 175/414 |
| 3,259,403 | A | * | 7/1966  | Hjalsten et al. ............. 175/215 |
| 3,842,920 | A | * | 10/1974 | Barnetche-Gonzalez .... 175/299 |
| 4,852,672 | A |   | 8/1989  | Behrens |

FOREIGN PATENT DOCUMENTS

| DE | 0732395 | 2/1943 |
| DE | 732395  | 3/1943 |
| DE | 9211782 | 3/1993 |
| EP | 1217165 | 6/2002 |

\* cited by examiner

*Primary Examiner*—Jennifer H. Gay
*Assistant Examiner*—Matthew J. Smith
(74) *Attorney, Agent, or Firm*—Abelman, Frayne & Schwab

(57) ABSTRACT

A concrete drill for a rotary and percussively driven hand tool machine with a cutting part (1) and a striking part (2) that is axially and limited displaceable relative to the cutting part (1). Each of the cutting part (1) and the striking part (2) have a respective facial surface work area for machining a bore hole surface. The respective facial surface work area of the cutting part (1) and the striking part (2) radially overlap upon rotation of the concrete drill.

14 Claims, 3 Drawing Sheets

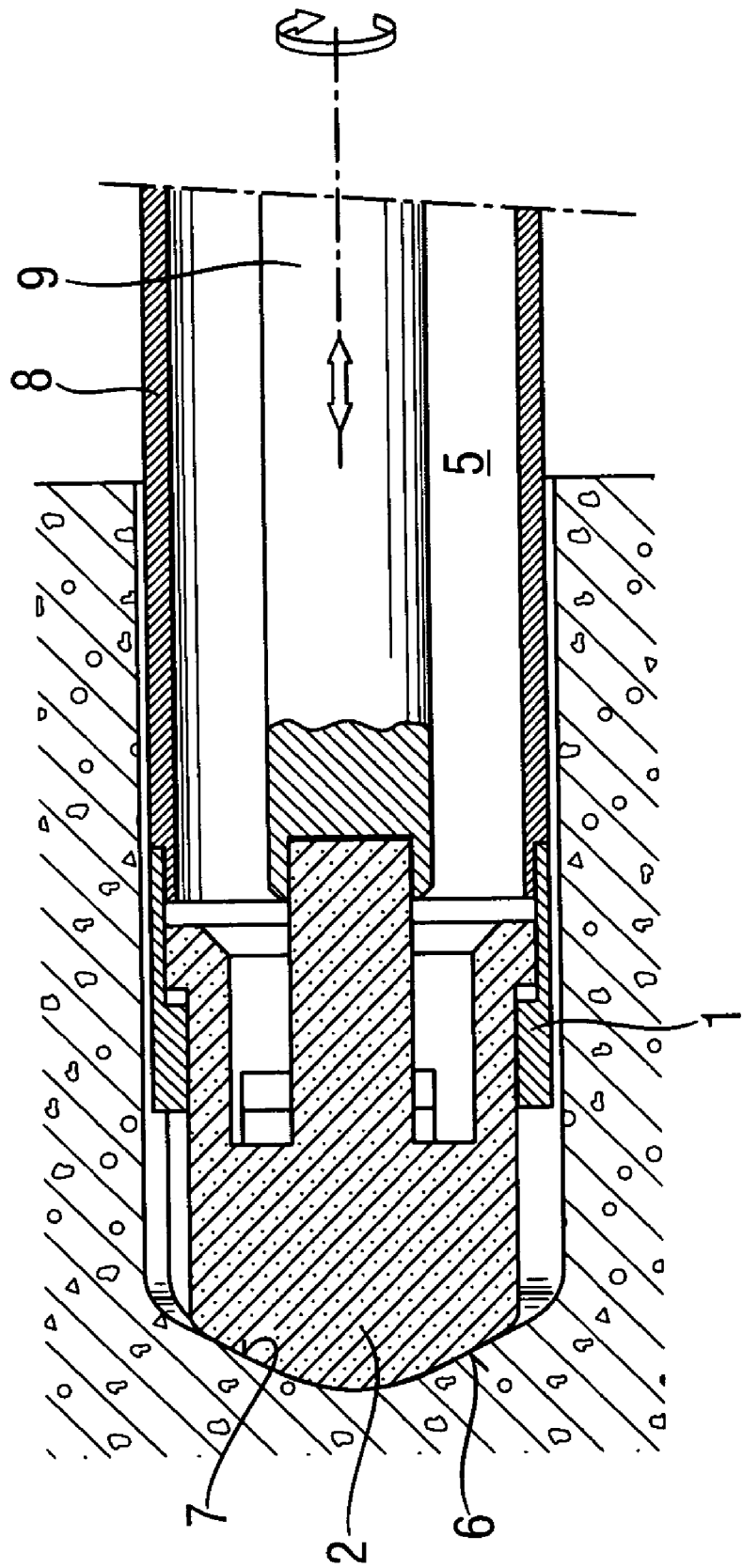

CONCRETE DRILL

BACKGROUND OF THE INVENTION

The invention relates to a rotary and percussive concrete drill with hard material elements that can be driven by a hand tool machine.

Conventionally, a small concrete drill up to a bore diameter of 40 mm driveable by a hand tool machine, to which the invention is limited, is configured either in one piece as a hammer drill with a fixed drill head comprising hard material elements or in two pieces with a drill head that is axially displaceable relative to the drill shaft and equipped with hard material elements. Such percussively and rotary stressed hard material elements usually have a blunt blade with a cutting radius greater than 1/20 of the bore diameter and a negative rake angle of −25° to −45°, wherein high impact energies are required for a predominantly grinding degradation process and wherein the rebar imbedded in the concrete are only inefficiently bored. The high airborne and impact noise is particularly prevalent in the construction and allied trades.

According to U.S. Pat. No. 4,852,672, a small concrete drill comprises a purely rotary cutting part and an impact part passing separately through the drill shaft, which creates a pilot bore hole that advances axially for relieving stress on the bore hole surface. According to DE 19748987, a large stone drill with a purely rotary cutting part equipped with hard material elements is configured with an impactable ram arranged within the hollow central tube of the drill shaft, wherein the ram creates a pilot bore hole that advances axially for relieving stress on the bore hole surface. The same degradation process constantly acts on a fine structure zone in the bore hole surface by virtue of this spatial separation of function one.

SUMMARY OF THE INVENTION

The object of the invention is to provide a small concrete drill that can be driven by a hand tool machine and has efficient drilling power in reinforced and unreinforced concrete. A further aspect relates to the reduction of the required impact energies.

This object is achieved by a rotary driven, small concrete drill that has a cutting part and a striking part that is limited axially displaceable relative to the cutting part. The cutting part and the striking part each have work zones on their facial surface work for working the surface of a bore hole. The facial surface work zones of the cutting part and of the striking part overlap upon rotation of the concrete drill.

By virtue of the radial overlapping of the facial surface work zones, the associated part of the surface of the borehole is alternately worked by the striking part and the cutting part on rotation of the concrete drill. The ramming striking part preliminarily breaks down a fracture zone in an axial fine structure area of 0.1 mm–1.0 mm, in which the required machining force (normal and cutting force) for the cutting/chipping is substantially less than the required force in material not broken down in advance. Corresponding experiments document a reduction of the machining forces of up to 80%. The cutting that is effected by chipping is efficient both in reinforced and unreinforced concrete. The airborne and impact noise is reduced by virtue of the possible reduction of the percussive energies. Similarly, the hand tool machines driving the tool can be configured smaller and lighter with lower vibration.

Advantageously, upon radial rotation, the work zones overlap from a small central zone up to the entire bore radius, wherein almost the entire full bore is alternately machined using two different degradation processes.

Advantageously, in an intermediate position of the striking part, the cutting part and the striking part form, when rotating, a substantially common plane, slightly curved or slightly conical mantle head surface on the leading end on the head side, whereby upon repeated percussive stressing, the cutting part and the striking part are relieved of stress relative to the bore hole surface, and whereby the two different degradation processes are completely dissociated.

Advantageously, at least on the head-side leading end, the striking part and the cutting part are configured nested in the transverse plane with at least to percussive segments, wherein upon rotation of the concrete drill, the striking part and the cutting part are multiply alternatively associated with a fine structure area in the bore hole surface.

Advantageously, peripherally adjacent percussive segments and cutting segments form common, axially running intermediate segment surfaces, wherein simple mutual axial guidance and rotary driving of the percussive segments is produced.

Advantageously, at least two percussive segments are connected to each other on the head-end leading end of the striking part, wherein they have a geometry that is capable of accepting loading.

Advantageously, precisely two diametrically opposed percussive segments connected with each other are arranged nested in precisely two diametrically opposed unconnected cutting segments at the head-end leading end, wherein with mutual guidance a relatively compact and thus highly loadable striking part can be realized.

Advantageously, the cutting edges of the cutting part or the cutting segment have a cutting radius of less than 1/20 of the bore hole diameter and have a rake angle in the range (−10° to +120°), wherein they are optimized to a chipping machining process and sever rebar satisfactorily.

Advantageously, the cutting edges are configured using hard material elements; further advantageously the hard material insets have layers made of polycrystalline diamond (PCD), which exhibit less wear and thus have a greater service life.

Advantageously, a limited axially displaceable ram is associated with the striking part, wherein a steep ram pulse running through the striking part is transmissible with low recoil almost entirely to the striking part, which rams into the bore hole surface and breaks the surface down in its fine structure area.

Advantageously, the striking part is made of a very wear-resistant material; for example, a PCD coated eyelid-shaped hard metal mounting, whereby the service life of the striking part is increased.

Advantageously, the cutting part is mounted axially and limited relative to a chuck or insertion end for receiving in a hand tool machine, whereby the cutting part is completely dissociated from percussive stress, and the blades are stressed less and have a longer service life.

Advantageously, the cutting part, preferably the drill shaft, is spring biased and axially resilient against the insertion end, whereby a specific perpendicular force of the cutting part on the work piece is realized.

Advantageously, the cross-section through the head-end leading end has large-surface, segment spaces, wherein cuttings can be evacuated from the bore hole.

Advantageously, a drill shaft connected non-rotationally with the cutting part is configured as a hollow cylinder, whereby the cuttings can be aspirated from the bore hole via the central shaft.

BRIEF DESCRIPTION OF THE INVENTION

The exemplary embodiment of the invention will be more completely described with reference to the drawings, wherein:

FIG. 3a, 3b show a 90° offset longitudinal section of a head-end leading end of a concrete drill, in accordance to the invention.

DETAILED DESCRIPTION OF THE INVENTION

Figure 2:
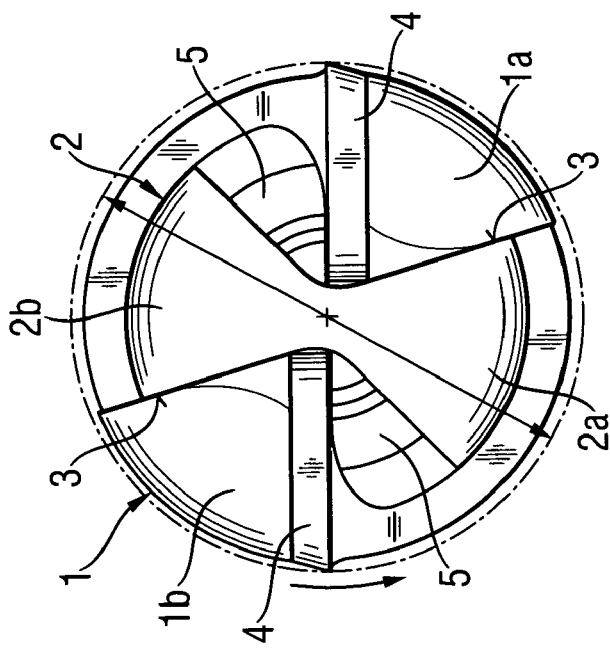
FIG. 2 shows a top view onto the head-end leading end of the concrete drill, in accordance to the invention.
Figure 1:
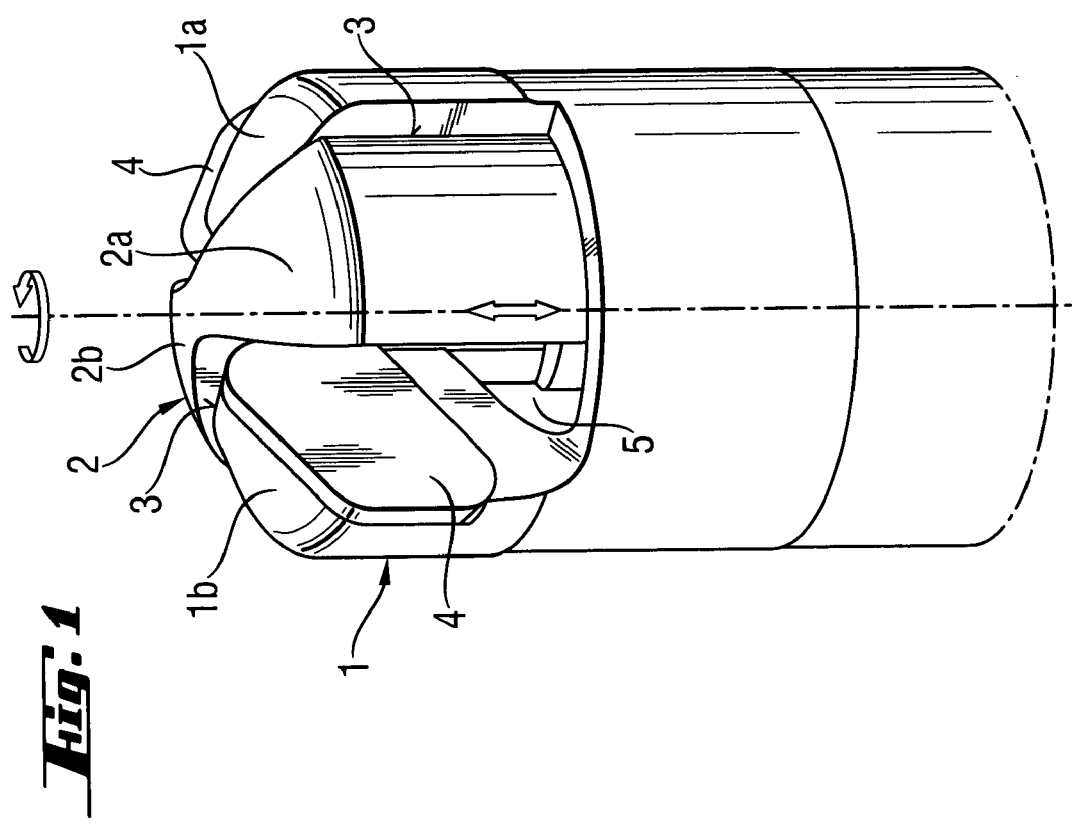
FIG. 1 shows a perspective representation of a head-end leading end of a concrete drill, in accordance to the invention.

According to FIGS. 1 and 2, the head-end leading end of a rotary driveable, small concrete drill has a cutting part 1 and a limited axially displaceable striking part 2 that is perpendicular to the angle of representation, wherein the respective facial surface work zones of the cutting part and the striking part overlap from a small central zone to the total bore radius, upon rotation of the drill. The striking part 2 and the cutting part 1 are nested within each other, in the transverse plane, with two striking segments 2a, 2b and two cutting segments 1a, 1b, wherein peripherally adjacent striking segments 2a, 2b connected to each other in the central zone form with the cutting segments 1a, 1b common axially running intermediate segment surfaces 3. The sharp cutting edges formed of hard material insets 4 with layers of polycrystalline diamond (PCD) of the cutting segments 1a, 1b have a rake angle of 0°, wherein large surface area, segment spaces 5 are disposed ahead of the cutting segments 1a in the direction of rotation.

Figure 3A:
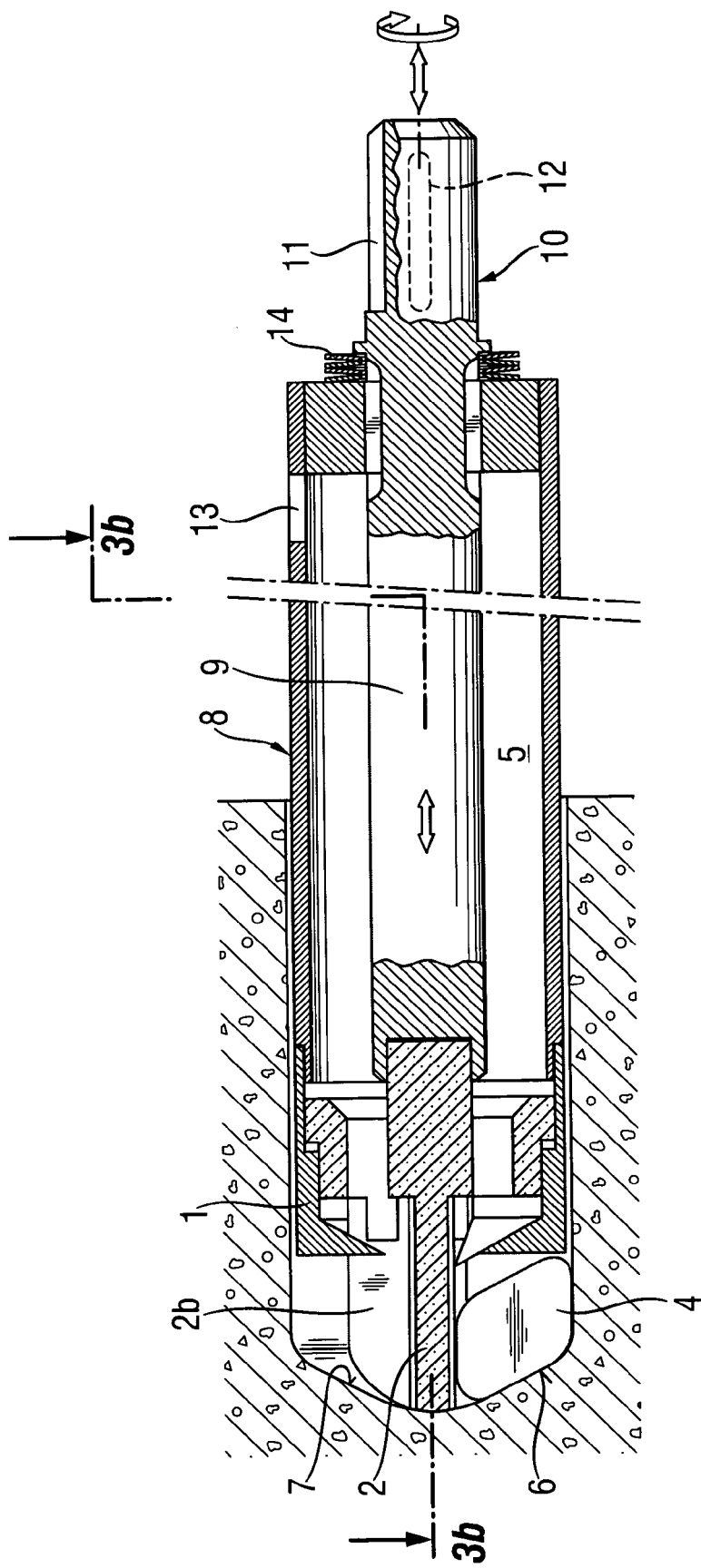

According to FIG. 3a, 3b, the cutting part 1 and the striking part 2 made of PCD covered hard material, shown in an axial intermediate position, when rotated form a slightly curved, shared, mantle head surface 6 at the head-end leading end, which machines the associated bore hole surface 7. A drill shaft 8 connected non-rotationally with the cutting part 1 is configured as a hollow cylinder. Separately, in the drill shaft 8, an axially limited displaceable ram 9 is associated with the striking part 1, wherein the space 5 extends longitudinally between the ram 9 and the striking part 1. According to FIG. 3a, the cutting part 1 is connected via the drill shaft 8 limited and axially displaceable with the insertion end 10, which has rotation guide grooves 11 and axially closed locking grooves 12.

The space 5 is connected to an aspiration opening 13 in the drill shaft 8. The cutting part 1 is spring biased via the drill shaft 8. The spring means 14, for example, is a helical spring biased against the insertion end 10.

What is claimed is:

1. A concrete drill for a rotary and percussively driven hand tool machine comprising a cutting part (1) and a striking part (2) axially limited displaceable relative to the cutting part (1), the cutting part (1) and the striking part (2) each have at their facial surfaces work zones for working a bore hole surface (7), wherein the respective facial surface work zones of the cutting part (1) and the striking part (2) radially overlap upon rotation of the concrete drill, wherein, in an axial intermediate position of the striking part (2), the cutting part (1) and the striking part (2) upon rotation of the concrete drill form a common mantle head surface (6) at a head-end leading end of the striking part (2) and the cutting part (1), and wherein two striking segments (2a, 2b) and at least two cutting segments (1a, 1b) are nested in each other in a transverse plane, at least at the head end leading end of the striking part (2) and the cutting part (1).

2. The concrete drill of claim 1, wherein peripherally adjacent striking segments (2a, 2b) and cutting segments (1a, 1b) form common, axially running intermediate segment surfaces (3).

3. The concrete drill of claim 1, wherein the at least two striking segments (2a, 2b) are connected with each other at the head-end leading end of the striking part (2).

4. The concrete drill of claim 3, wherein two diametrically opposed striking segments (2a, 2b) connected to each other are nested in two diametrically opposed unconnected cutting segments (1a, 1b) at the head-end leading end.

5. The concrete drill of claim 4, wherein one of the cutting edges of the cutting part (1) and the cutting segment (1a, 1b) has a cutting radius of less than 1/20 of the bore diameter.

6. The concrete drill of claim 5, wherein one of cutting edges of the cutting part (1) and the cutting segment (1a, 1b) has a rake angle between −10° to +10°.

7. The concrete drill of claim 3, wherein the cutting edges are made of hard material insets (4).

8. The concrete drill of claim 7, wherein the hard material insets (4) have layers made of polycrystalline diamond (PCD).

9. The concrete drill of claim 3, wherein the head-end leading end has a space (5) at least in a transverse plane that is configured segmental with a large surface area.

10. The concrete drill of claim 1, wherein the striking part (2 is made of a very wear-resistant material.

11. The concrete drill of claim 1, wherein the cutting part (1) at one insertion end (10) is mounted axially limited displaceable for reception in a hand tool machine.

12. The concrete drill of claim 11, wherein the cutting part (1) is spring-biased by a spring means (14) that is axially biased against the insertion end (10).

13. A concrete drill for a rotary and percussively driven hand tool machine comprising a cutting part (1) and a striking part (2) axially limited displaceable relative to the cutting part (1), the cutting part (1) and the striking part (2) each have at their facial surfaces work zones for working a bore hole surface (7), wherein the respective facial surface work zones of the cutting part (1) and the striking part (2) radially overlap upon rotation of the concrete drill, wherein a drill shaft (8) is connected non-rotationally with the cutting part (1) and an axially limited guidable ram (9), in the drill shaft (8) is separately associated with the striking part (2).

14. The concrete drill of claim 13, wherein the drill shaft (8) is configured as a hollow cylinder.

* * * * *